United States Patent
Bergen et al.

(10) Patent No.: US 6,943,846 B2
(45) Date of Patent: Sep. 13, 2005

(54) MULTI-PICTURE IN PICTURE SYSTEM

(75) Inventors: Franciscus Herman Maria Bergen, Eindhoven (NL); Jan Klijn, Eindhoven (NL); Johan Leon Schirris, Eindhoven (NL); Ronald Simon Antonius Schram, Eindhoven (NL)

(73) Assignee: Robert Bosch GmbH, Stuttgart (DE)

(*) Notice: Subject to any disclaimer, the term of this patent is extended or adjusted under 35 U.S.C. 154(b) by 394 days.

(21) Appl. No.: 10/023,092

(22) Filed: Dec. 17, 2001

(65) Prior Publication Data

US 2002/0118298 A1 Aug. 29, 2002

(30) Foreign Application Priority Data

Dec. 20, 2000 (EP) .............................. 00204656

(51) Int. Cl.⁷ ................................. H04N 5/45
(52) U.S. Cl. ..................... 348/565; 348/588
(58) Field of Search ............... 348/565, 588, 348/563, 564, 584, 598, 578, 47, 48, 159, 705, 153, 38, 211.11, 211.13; H04N 5/45, 5/445, 9/74, 9/76

(56) References Cited

U.S. PATENT DOCUMENTS

| | | | |
|---|---|---|---|
| 5,144,445 A | | 9/1992 | Higashitsutsumi |
| 5,255,097 A | * | 10/1993 | Spiero et al. ............... 348/706 |
| 5,436,618 A | * | 7/1995 | Van Steenbrugge .... 340/825.25 |
| 6,075,554 A | * | 6/2000 | Andrews et al. ......... 348/14.08 |
| 6,646,675 B1 | * | 11/2003 | Tang et al. ................. 348/143 |

FOREIGN PATENT DOCUMENTS

| | | |
|---|---|---|
| JP | 05 041816 A | 2/1993 |
| WO | WO 98/39739 | 9/1998 |

* cited by examiner

Primary Examiner—Sherrie Hsia
(74) Attorney, Agent, or Firm—Kenyon & Kenyon

(57) ABSTRACT

A multi-picture in picture system in which each camera is coupled in a daisy chain adds its part of the complete picture on a CVBS-line. The television/monitor doesn't have to prepare the complete picture because each camera does it. Furthermore, no problems with locking occur because each camera adds its picture at the "place" where it is also locked.

6 Claims, 2 Drawing Sheets

MPIPS

MULTI-PICTURE IN PICTURE SYSTEM

FIELD OF THE INVENTION

The invention relates to a multi-picture in picture system comprising at least two cameras linked as a chain together.

BACKGROUND INFORMATION

Cameras linked as a chain are, for example, known from W098/39739 wherein system is described for data processing for motion analysis, the different cameras having different degrees of information content.

The television/monitor, which receives the pictures from the different cameras, creates the total picture to be viewed.

SUMMARY OF THE INVENTION

The invention has for one of its objects to provide a multi-picture in picture system, which is economically constructed.

A multi-picture in picture system is obtained using a CVBS-line (Composite Video Baseband Signal). By adding each picture on the CVBS-line each picture can have the maximum frame rate.

A first camera acts as a system master whereby the other camera(s) are each locked to a previous camera.

By locking each camera to a previous camera problems of different delays are overcome. Each camera adds its part of the picture at the place in the daisy-chain cable where the camera also is locked. So each locking place and insertion place is the same which results in no problems with relation to unknown delays.

This overcomes the problem prior art systems have, in that the locking of the color carrier has to have a precision of about 5 nanoseconds while a cable with a length of 100 meters can have a delay of 1 microsecond.

The length of the cable which determines the total delay is no longer relevant.

Instead of the known systems where the television/monitor has to cope with the multi picture in picture creation, in the system according to the invention the television/monitor does not have to cope with this situation and therefore can be much cheaper.

In the system according to the invention each camera creates its picture at the "place" in the total picture.

These and other objects of the invention are described hereinafter by way of example with reference to the non-limiting examples.

DETAILED DESCRIPTION

Figure 1:
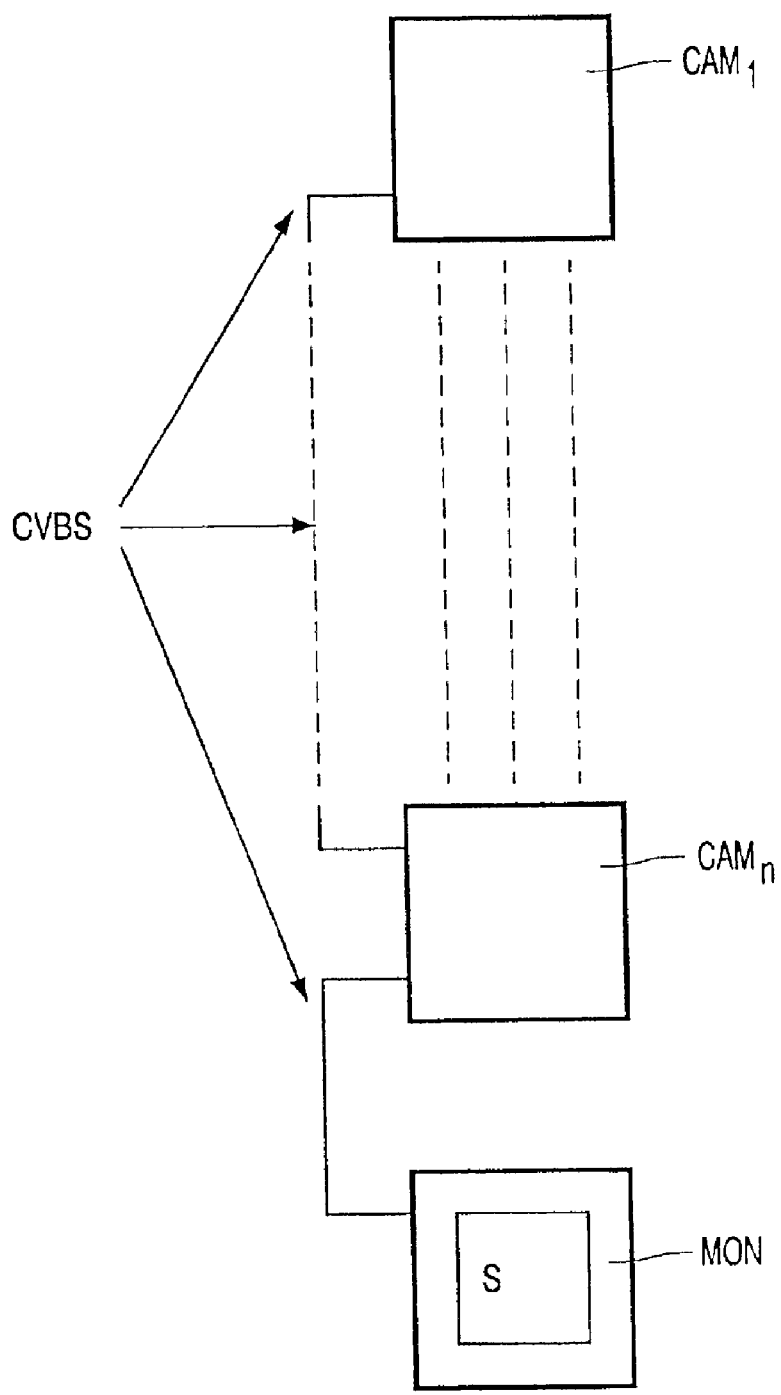
FIG. 1 illustrates schematically an example of a multi-picture in picture system according to the invention.

FIG. 1 shows schematically an example of a multi-picture in picture system MPIPS according to the invention.

In this example the system comprises a number of cameras CAM1–CAMn, linked together with a CVBS signal as a daisy chain. After the last camera CAMn a monitor MON is coupled to make the result visible on a screen S of the monitor.

Each camera can insert on the CVBS line a part of its observed picture or a downscaled version of that picture. The location and size of the inserted picture is programmable for each camera.

A first camera CAM1 acts as a system master and the other cameras are locked to the previous camera to horizontal synchronization, vertical synchronization and color phase locked to the system master. In this manner it is possible to cope with different delays. Because the insertion of the picture and the locking is at the sane place and timing no differences in delay occur.

Figure 2:
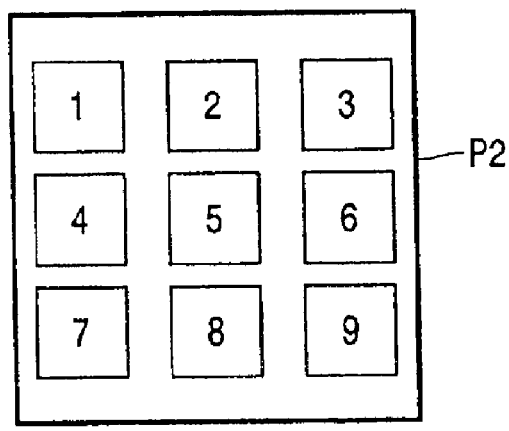
FIG. 2 illustrates schematically an example of a screen with multi-picture in pictures.

FIG. 2 shows a picture screen P2 with nine pictures 1–9 in a multi-picture in picture, whereby each picture is prepared by each camera with the maximum frame rate on the CVBS signal.

Instead, the prior art discloses systems where the pictures 1–9 don't have the maximum frame rate and where the pictures are also not prepared on the CVBS-line.

Figure 3:
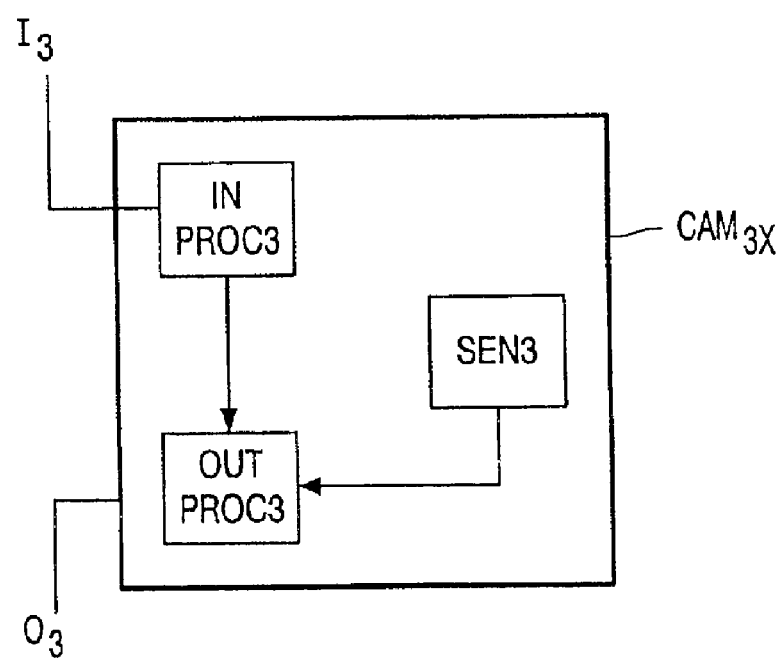
FIG. 3 illustrates schematically an example of a camera for use in a system according to the invention.

FIG. 3 shows schematically a camera CAM3x coupled with an input I3 to a previous camera (not shown), on which camera the camera CAM3x is locked. The camera records a picture on a sensor SEN3 and supplies the recorded picture to the daisy chain (CVBS-line) at the output O3.

The input I3 is coupled to input processing means INPROC3. The input processing means supply a signal to output processing means OUTPROC3. The output processing means also receives the signal from the sensor SEN3.

In this way a multi-picture in picture system is obtained using a CVBS-line (Composite Video Baseband Signal). By adding each picture on the CVBS-line each picture can have the maximum frame rate.

A first camera acts as a system master whereby the other camera(s) are each locked to a previous camera.

By locking each camera to a previous camera problems of different delays are overcome. Each camera adds its part of the picture at the place in the daisy-chain cable where the camera also is locked. So each locking place and insertion place is the same which results in no problems with relation to unknown delays.

This overcomes the problem prior art systems have, that is such systems have to cope with this kind of problem because the locking of the color carrier has to have a precision of about 5 nano seconds while a cable with a length of 100 meters can have a delay of 1 micro second.

The length of the cable which determines the total delay is no longer relevant. Instead of the known systems where the television/monitor has to cope with the multi-picture in picture creation, in the system according to the invention the television/monitor has not to cope with this situation so can be much cheaper.

In the system according to the invention each camera creates its picture at the "place" in the total picture.

Those skilled in the art will be well aware that the above examples are not limitative for the invention concerned. It is of course possible to change the number of pictures or cameras. One of the main items of the invention is that in the system according to the invention for the main part the cameras prepare the pictures to be displayed on the television/monitor and not the television/monitor.

What is claimed is:

1. A multi-picture in picture system comprising at least two cameras linked as a chain together with a CVBS-line, whereby a first camera in the chain acts as a system master and the other camera(s) are locked to a previous camera in the chain, each camera inserting a picture on the CVBS line.

2. The multi-picture in picture system according to claim 1, further comprising input processing means for horizontal synchronization, vertical synchronization and color carrier phase-locking a camera to a previous camera.

3. The multi-picture in picture system according to claim 1, further comprising a monitor coupled to the chain.

4. The multi-picture in picture system according to claim 1, wherein at least one camera comprises output processing means configured to insert on the CVBS-line a part of its observed picture.

5. The multi-picture in picture system according to claim 1, wherein at least one camera comprises input processing means configured to insert on the CVBS-line a downscaled version of its observed picture.

6. A method to obtain a multi-picture in picture having the steps of recording at least two pictures, coupling the information of the pictures on a chain of cameras together with a CVBS-line, each camera inserting a picture on the CVBS line, and displaying the multi-picture in picture.

* * * * *